J. B. ATWATER.
Hay Loader.
No. 43,964. Patented Aug. 30, 1864.
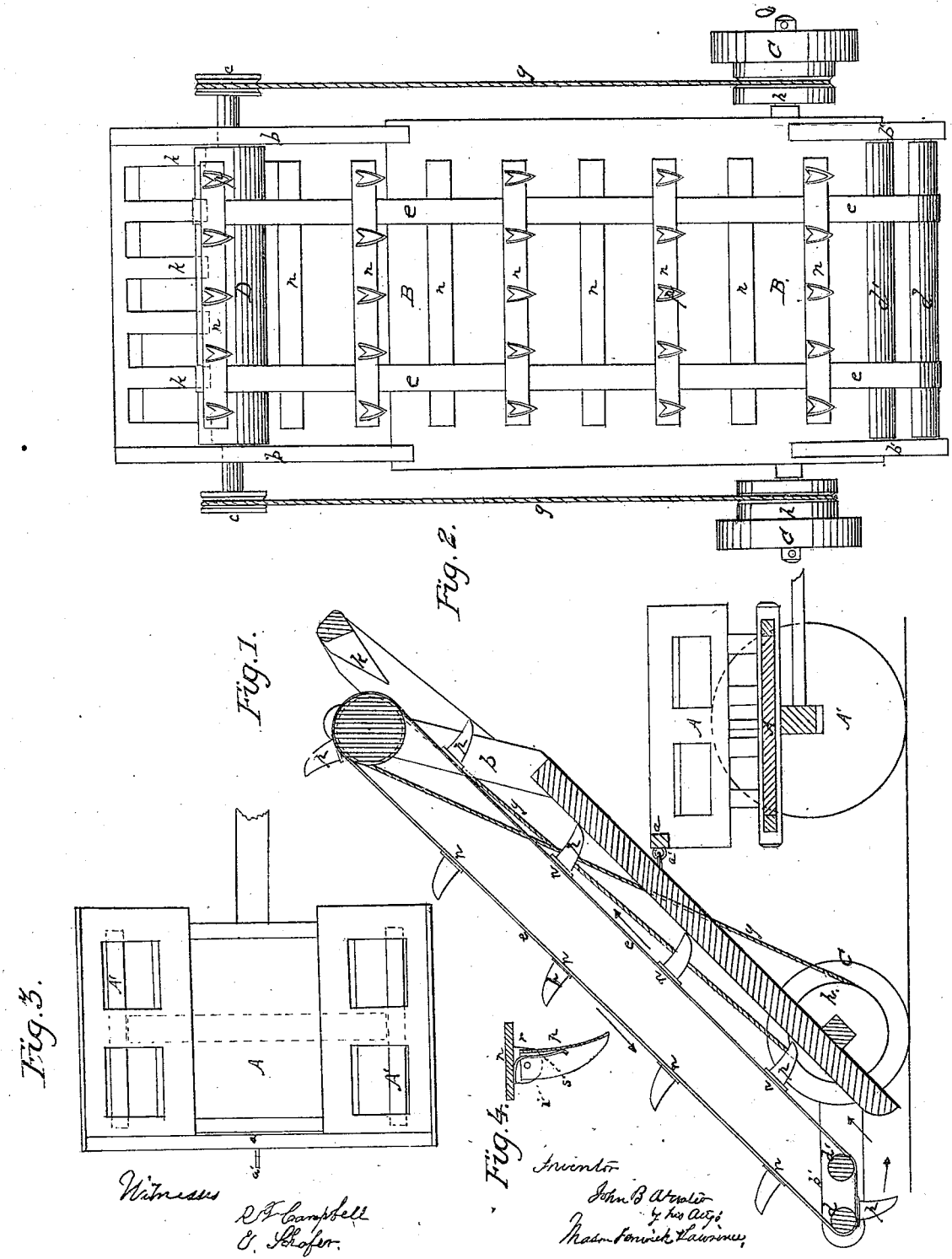

UNITED STATES PATENT OFFICE.

JOHN B. ATWATER, OF CHICAGO, ILLINOIS.

IMPROVEMENT IN MACHINES FOR LOADING HAY.

Specification forming part of Letters Patent No. 43,964, dated August 30, 1864.

*To all whom it may concern:*

Be it known that I, JOHN B. ATWATER, of Chicago, Cook county, State of Illinois, have invented a new and Improved Machine for Raking and Loading Hay and Grain; and I do hereby declare that the following is a full, clear, and exact description thereof, reference being had to the accompanying drawings, making a part of this specification, in which—

Figure 1 is a vertical longitudinal section through my improved machine arranged for operation. Fig. 2 is a top view of the raking and loading apparatus. Fig. 3 is a top view of the wagon shown in section, Fig. 1. Fig. 4 is a section through a rake-tooth, showing the manner in which they are constructed and applied to their heads.

Similar letters of reference indicate corresponding parts in the several figures.

By my invention I obtain a machine which, when it is drawn over a field of cut hay or grain, will rake up the same and deliver it at an elevated point either upon a wagon or upon anything adapted for receiving it.

Another object of my invention is to avoid the breaking of the rake-teeth or derangement of the machine in consequence of said teeth striking obstructions, as will be hereinafter explained.

To enable others skilled in the art to make and use my invention, I will describe its construction and operation.

In order that my invention may be fully understood, I will describe it as arranged for operation in the field, for which purpose an ordinary wagon may be used for receiving the cut product as it is elevated and delivered by the rakes. The wagon which I have represented in the drawings is especially intended for use in conjunction with the raking apparatus, and consists of an open flaring body, A, mounted upon two wheels, A', and provided with a rear transverse bar, a, having a hook, a', projecting out behind it at an intermediate point between its ends. This hook a' is connected to a strong staple which is secured to the forward side of an inclined bed, B, which is supported at its forward part by the rear transverse bar of the wagon and at its rear part upon carriage-wheels C C. The rear end of the inclined bed B is slightly elevated above the surface of the ground and the upper end of said bed is carried above the top of the wagon A.

b b represent two arms, which are secured to the sides of the bed B and project some distance above the upper end of this bed, and carry a transverse drum, D, which is supported in a horizontal position, or in a plane parallel to the bed B. The shaft of said drum projects out from each side of the frame b and receives on its ends grooved pulleys c c. Two arms, b' b', are secured to the lowermost end of the inclined bed B and project out horizontally therefrom, for the purpose of supporting the ends of two parallel rollers, d d', which extend transversely across from one arm to the other in rear of the bed B, and carry two or more belts, e e, which pass around the large drum D at the upper end of the machine, as shown in Figs. 1 and 2. The rollers d d' and drum D are arranged in such relation to the upper surface of the inclined bed B that the lowermost or ascending portions of the endless belts are always in planes parallel to said surface, and those portions of these belts extending across the lower sides of the two horizontal rollers d d' are always parallel to the surface of the ground over which the machine is drawn.

The belts e e are driven in the direction indicated by the arrows in Fig. 1 by means of cords g g, which pass around the pulleys c c of drum D, and, being crossed, are carried around large driving-pulleys h on the sides of supporting-wheels C C. Thus when the machine is drawn along the wheels C will, through the medium of cords and pulleys, rotate the drum D and keep the endless belts in motion, and as the pulleys c c are somewhat smaller than their respective driving-pulleys h h the motion of the belts will be relatively faster than that of the machine moving over the ground.

To the endless belts e e, and at proper intervals apart, are suitably secured rake heads or bars n n n, which are each armed with teeth p p p, arranged side by side, from one end to the other of their respective heads. These teeth are of sufficient length to touch or nearly touch the upper surface of the inclined bed B as they ascend over it with their load, and they are each pivoted by a transverse pin, i, to ears r r, which are secured rigidly to the heads n, as clearly shown in the detail view, Fig. 4. Behind each tooth is a spring, s, which will keep its tooth in proper position and resist all ordinary pressure upon its forward edge; but should one or any number of these teeth strike an obstruction, which would be liable to break or injure them if they were rigid, they will yield backward and pass uninjured over the obstruction, and then be forced back into place again by the recoil of their respective springs. By this yielding provision I am enabled to employ very-stiff and strong teeth and to construct them in the form represented in Figs. 2 and 3, which form is best adapted for the raking and discharging of the cut product without liability of clogging or entangling the parts. As the teeth successively move around the drum D they pass between fixed teeth $k\ k$, which operate like a comb and clear the rake-teeth of any of the hay which might be carried back again, and although it will be found in practice that the rakes will each deliver their load immediately after passing off the upper end of the inclined bed B, still in windy weather and from other causes the hay might in small quantities be carried over the drum if a contrivance like the comb were not used to clear the teeth, as above described.

It will be seen from the above description that the inclined bed B is mounted upon carriage-wheels C C at its rear end and supported at its forward end by the rear part of the wagon upon which the cut product is delivered. By this arrangement the raking apparatus and wagon are so combined that while one will not interfere with the operation of the other the cut product will be deposited directly upon the wagon-body without the intervention of any auxiliary contrivances for this purpose.

I am aware that an inclined bed and an inclined endless rake have been used together for the purpose of raking and loading hay. Therefore I do not claim such devices *per se*, nor in combination, broadly considered; but What I do claim as my invention, and desire to secure by Letters Patent, is—

The combination of the plates $n\ r$, concave teeth $p$, spring $s$, with the bands $e\ e$ of a hay raking and loading apparatus, substantially in the manner and for the purpose described.

J. B. ATWATER.

Witnesses:
J. A. HOISINGTON,
E. HURD.